United States Patent [19]

Cone

[11] Patent Number: 5,522,178
[45] Date of Patent: Jun. 4, 1996

[54] METHOD AND APPARATUS FOR BULB MAINTENANCE AND PLANTING

[76] Inventor: Rodger W. Cone, 203 Stoughton Rd., Edgerton, Wis. 53534

[21] Appl. No.: 268,275

[22] Filed: Jun. 30, 1994

[51] Int. Cl.$^6$ ................................................ A01B 79/00
[52] U.S. Cl. .......................... 47/58; 47/73; 47/76; 47/78
[58] Field of Search ................... 220/771; 47/76 R, 47/78, 75 N, 79 N, 81 N, 58.01

[56] References Cited

U.S. PATENT DOCUMENTS

| | | | |
|---|---|---|---|
| 912,472 | 2/1909 | Hart | 220/760 |
| 923,663 | 6/1909 | Kroeger | 47/75 N |
| 1,897,520 | 2/1933 | Kimber | 47/41.1 |
| 1,987,255 | 1/1935 | Husted | 47/75 N |
| 2,252,073 | 8/1941 | Gray . | |
| 2,320,262 | 5/1943 | Campbell | 220/760 |
| 2,369,902 | 2/1945 | Krueger | 220/760 |
| 2,394,192 | 2/1946 | Mann | 47/76 R |
| 2,610,760 | 9/1952 | Ball | 220/771 |
| 2,741,875 | 4/1956 | Van Staalduinen | 47/75 N |
| 2,902,795 | 9/1959 | Heigl et al. . | |
| 2,979,844 | 4/1961 | Lattuca | 220/771 |
| 3,009,603 | 11/1961 | Stockdale | 47/66 R |
| 3,324,591 | 6/1967 | Bergstein . | |
| 3,348,727 | 10/1967 | Ettlinger | 220/771 |
| 3,415,012 | 12/1968 | Stubbmann | 47/76 R |
| 3,678,620 | 7/1972 | Voges . | |
| 3,896,587 | 7/1975 | Insalaco | 47/66 R |
| 4,220,254 | 9/1980 | Morton | 220/760 |
| 4,240,554 | 12/1980 | Bock | 220/760 |
| 5,060,420 | 10/1991 | Bergman . | |
| 5,222,326 | 6/1993 | Higgins | 47/73 R |

FOREIGN PATENT DOCUMENTS

| | | | |
|---|---|---|---|
| 588400 | 3/1994 | European Pat. Off. | 47/76 R |
| 8251 | 5/1889 | United Kingdom | 47/75 N |
| 13404 | 8/1992 | WIPO | 47/78 |

*Primary Examiner*—Henry E. Raduazo
*Attorney, Agent, or Firm*—DeWitt Ross & Stevens

[57] ABSTRACT

A method and apparatus for planting and maintaining bulberous and tuberous plants is described. The apparatus includes a bulb container having a top open end and a bottom closed end for planting the bulb, and a placement container having a top open end and a bottom closed end for preserving the hole that is created upon removal of the bulb container. The bulb and placement containers may be color coded to correspond to a particular bulb. The method for planting and maintaining a bulb includes placing the bulb and soil in the bulb container, planting the bulb container, removing the bulb container at the end of the bulb's active growing season, replacing the bulb container with the placement container to preserve the hole left upon removal of the bulb container, storing the bulb container during the bulb's dormant season, removing the placement container at the start of the bulb's active growing season, and replacing the placement container with the corresponding bulb container.

13 Claims, 4 Drawing Sheets

METHOD AND APPARATUS FOR BULB MAINTENANCE AND PLANTING

FIELD OF THE INVENTION

The present invention relates generally to an apparatus and method for maintaining and planting bulbs. More particularly, the present invention relates to a method and apparatus for planting, maintaining, removing, and storing bulberous or tuberous plants which uses a first color coded bucket for holding and planting the bulb and a second color coded bucket for marking the position of the bulb and protecting its burial position during the bulb's dormant season.

DESCRIPTION OF THE PRIOR ART

Several devices and methods for planting, protecting, and harvesting bulbs exist in the prior art. For example, U.S. Pat. No. 2,252,073 to Gray discloses a bulb protector which constitutes a hollow cylinder having an open top and a downwardly converging bottom with an open center. The hollow cylinder is preferably made of wire mesh in order to provide multiple openings throughout the structure. The top of the cylinder may be engaged with fingers or a tool to remove it from the ground and a metal clip may be attached to the top of the cylinder to designate the identity of the bulb.

U.S. Pat. No. 2,394,192 to Mann describes a gardening device which facilitates planting, locating, and removing bulbs. The device includes a receptacle having a base, slanting side walls, and a collar surrounding the circumference of the side walls, and at least one elongated upright member attached to the receptacle. The base and slanting side walls of the receptacle have perforations throughout. Furthermore, color coded identifying means such as disks may be attached to the upright member and a stick or similar member may be inserted through apertures contained at the top of the upright members to pull the device from the ground. The receptacle may also include a false perforate bottom. Due to its open structure and perforations, the Mann device is not designed to store a bulb and its surrounding soil. In addition, the Mann device does not provide a means for preserving the planting hole once the bulb is removed from the ground.

U.S. Pat. No. 2,902,795 to Hiegl et al. discloses a method for preparing plants for planting and harvesting which facilitates finding the bulbs in the earth and lifting them from the soil without imparting damage. The method includes the steps of wrapping the subterranean parts of plants in an elastic perforate envelope, inserting the envelopes in the soil such that the upper open rim of the envelope projects from the soil, and lifting the plant and envelope from the soil when harvesting.

U.S. Pat. No. 3,324,591 to Bergstein describes a device for planting, protecting, locating, and removing plant bulbs from the soil. The device consists of an upstanding portion, which acts as a handle and marker, and a receptacle portion having discontinuous walls, which form an envelope to retain a bulb, and an upwardly open mouth for inserting the bulb in the envelope. The device is formed from a continuous length of stiff material such as wire. The receptacle is formed by wrapping the wire into a spiral helix with three major turns.

U.S. Pat. No. 3,415,012 to Stubbmann describes a device and method for planting and recovering a bulb which includes an elongated tubular bag having an open mouth. The bag is preferably formed from limp stranded netting and further contains a color coded plastic band bonded to the top exterior rim of the bag.

U.S. Pat. No. 3,678,620 to Voges discloses a package for a plurality of bulbs or tubers which has a top opening and bottom opening for growing the stalk and roots of a plant, respectively. The package is designed to space the bulbs apart at a predetermined distance and protect the bulbs from rodents.

U.S. Pat. No. 5,060,420 to Bergman describes an apparatus and method for marketing and planting bulbs having a water-porous bag for enclosing a bulb, a filament attached to the bag for lowering the bag to a preferred depth in a planting hole, and an identifying element attached to the filament for identifying the bulb. The Bergman bag is preferably comprised of a biodegradable material and therefore is not adapted for the recovery of bulbs.

Accordingly, there is a need for a system for facilitating the planting, watering, identification, removal, and storage of flower bulbs which includes both 1) an apparatus which enables the bulb, as well as the soil surrounding the bulb, to be stored until the next planting season, and 2) an apparatus and method which preserves the holes created by the removal of the bulbs until the next planting season, thereby avoiding the need to redig holes in the ground for planting.

SUMMARY OF THE INVENTION

It is a principal object of the present invention to provide a method and apparatus for maintaining bulberous or tuberous plants.

It is a further object of the present invention to provide a method and apparatus which facilitates the planting, watering, bug control, color identification, removal, and storage of tuberous and bulberous plants.

It is a still further object of the present invention to provide a method and apparatus for maintaining bulbs which includes an apparatus which enables a bulb, as well as the soil surrounding the bulb, to be stored until the next planting season.

It is yet a further object of the present invention to provide a method and apparatus for maintaining and planting bulbs which preserve the holes created by the removal of the bulbs until the next planting season.

It is still a further object of the present invention to provide a method and apparatus for maintaining and planting bulbs which are easy and economical to manufacture, and which can be distributed in the form of a kit.

The apparatus for maintaining and planting tuberous and bulberous plants generally includes a first container for planting and storing the bulb and a second container for preserving the hole created upon removing the first container, which holds the bulb, from the ground. The first container has a top end that is open and a bottom end that is closed with a plurality of apertures through the bottom closed end. The second container has a top end which is open and a bottom end which is closed with the bottom end containing a plurality of apertures through it. Both the first and second containers may also include handles attached near their top ends to facilitate the handling and removal of the containers. Furthermore, either the first container, or both the first and second containers, may be color-coded to correspond to the color of a particular plant bulb which is used with the apparatus.

The method for maintaining and planting tuberous and bulberous plants with the above described apparatus includes the basic steps of placing the bulb along with an adequate amount of dirt in a first container having a closed bottom end with apertures and a top open end to allow for plant growth, planting the first container containing the bulb in the ground during the planting season, removing the first container containing the bulb from the ground at the end of the plant's active season thereby creating a hole in the ground, placing a second container having an open top end and a closed bottom end with apertures into the hole to preserve it for the next planting season, and storing the first container containing the bulb in a dry place during the bulb's dormant season. When the next planting season arrives, the second container is removed from the ground and replaced by the first container containing the bulb. The method for maintaining and planting bulbs may also include the step of color coding one or more of the first and second containers so that they correspond with the color of the bulb that is used with the containers.

There are several advantages which arise from using the method and apparatus of the present invention. Some of these advantages include: 1) the ability to design and redesign a garden using the color coded containers and visualize the results prior to any planting, 2) never digging another hole or losing another bulb once the apparatus and system have been used for the first time, 3) less physical labor in planting and maintaining bulbs, 4) increased economy resulting from less use of water and fertilizer due to the direct watering and fertilizing associated with the method and apparatus, 5) the ability to easily stagger planting in inclement weather and start planting earlier in the season, and 6) less damage to bulbs because the containers act as a barrier to insects, squirrels, mice, moles, and other pests.

The objects and advantages of the invention will appear more fully from the following more detailed description of the preferred embodiment of the invention made in conjunction with the accompanying drawings.

DETAILED DESCRIPTION OF THE INVENTION

Figure 1:
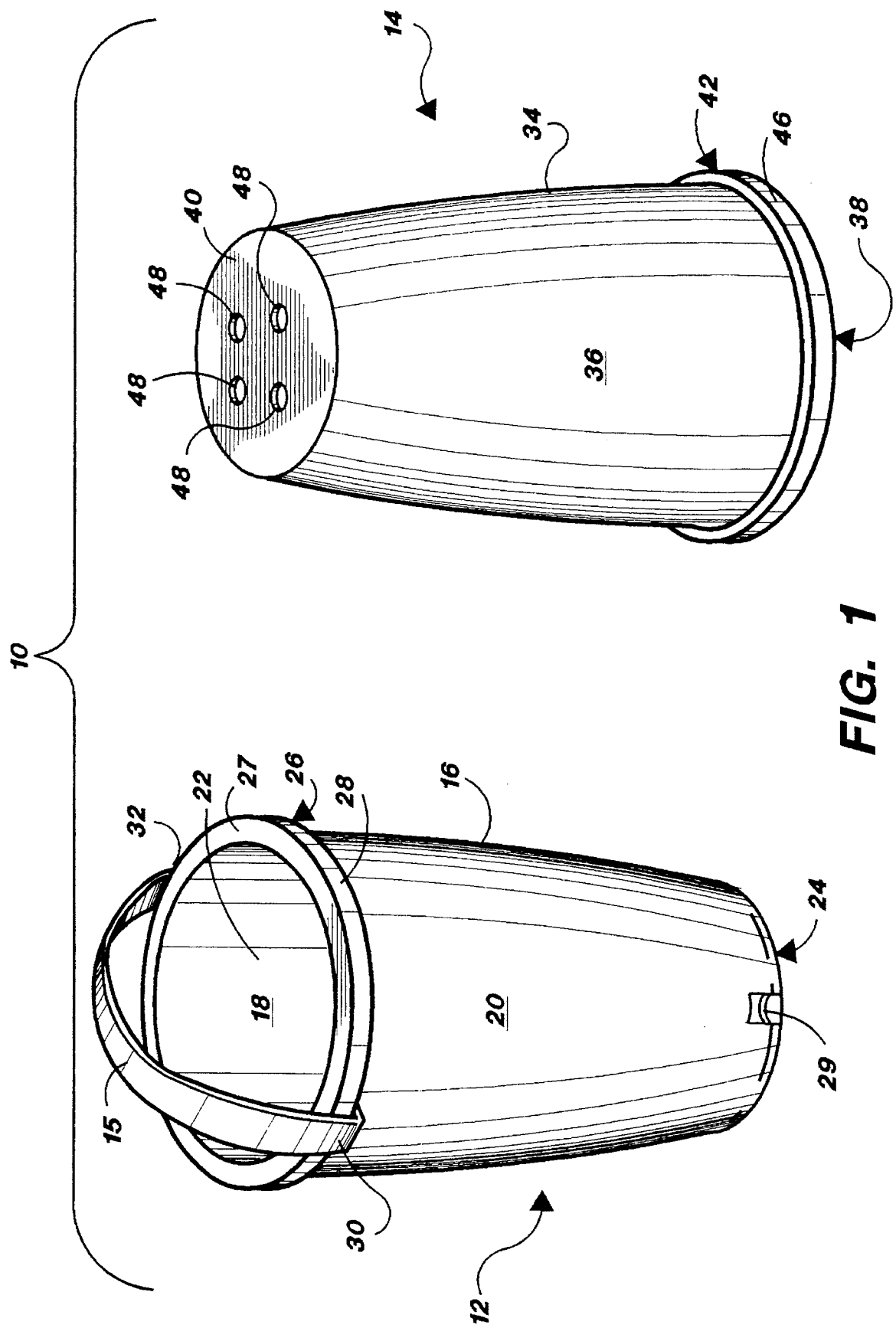
FIG. 1 is a perspective view of the bulb maintenance and planting apparatus of the present invention showing a bulb container which is designed to hold the bulb during growth and store the bulb during its dormant season, and a placement container which is designed to preserve the hole in the ground which exists after removal of the bulb container.

The present invention provides a method and apparatus for the planting and maintenance of bulberous or tuberous plants. Referring now to the figures, where numerals represent various elements and steps of the present invention, the bulb planting and maintenance apparatus 10 is generally illustrated in FIG. 1.

The bulb planting and maintenance apparatus 10 includes a bulb container 12 which functions to hold the bulb during growth and storage, and a placement container 14 which functions to preserve the space in the ground created by the removal of the bulb container 12. The bulb container 12 comprises a handle 15 and a first hollow cylindrical member 16 having an inner surface 18, an outer surface 20, a first open top end 22, and a second closed bottom end 24. The first hollow cylindrical member 16 further comprises a rim 26 located at the first open top end 22 of the first hollow cylindrical member 16.

The rim 26 comprises a planar ring 27 and a downwardly protruding lip 28 which extends from the flat planar ring 27. The planar ring 27 of the rim 26 has an outer diameter which is larger than the diameter of the first hollow cylindrical member 16 thereby causing the planar ring 27 and the downwardly protruding lip 28 of the rim 26 to extend outward and beyond the outer surface 20 of the first hollow cylindrical member 16. The first hollow cylindrical member 16 also comprises a plurality of apertures 29 which will be discussed in further detail with reference to FIG. 3.

The handle 15 of the first container 12 may be comprised of a strong and durable plastic and have first and second ends 30,32 which comprise a hook-like configuration. The hook-like configuration of the first and second ends 30,32 of the handle 15 can be secured underneath the downwardly protruding lip 28 of the rim 26 at opposite sides of the first hollow cylindrical member 16 to provide a means for placing, carrying, and removing the first hollow cylindrical member 16. Several other means for carrying and removing the first hollow cylindrical member 16 which conform to the function of the handle 15 are also contemplated by the present invention. For example, holes may be drilled into opposite sides of the first hollow cylindrical member 16 toward its first open top end 22 and a wire having first and second ends comprising a hook-like shape may be inserted through the holes and thereby secured to the first hollow cylindrical member 16.

The placement container 14 is illustrated in an inverted position to more clearly show its distinguishing features. The placement container 14 comprises a second hollow cylindrical member 34 having an inner surface (not shown), an outer surface 36, a first open top end 38, and a second closed bottom end 40. Like the first hollow cylindrical member 16, the second hollow cylindrical member 34 further comprises a second rim 42 which includes a second planar ring 44 and a downwardly extending edge 46 which extends from the second planar ring 44. Further, a plurality of ventilation holes 48 are contained in the second closed bottom end 40 of the second hollow cylindrical member 34 to allow for oxygen and moisture to enter the ground during winter and spring thaws.

Like the bulb container 12, a handle (not shown) may be attached to the second hollow cylindrical container 34 to aid in the removal of the placement container 14 prior to planting the bulb container 12 containing a bulb. The functions of the bulb container 12 and the placement container 14 are further explained with reference to FIG. 6.

The bulb container 12 and the placement container 14 are preferably comprised of a strong and durable plastic material such as polyethylene or a metal material such as aluminum or tin.

Figure 2:
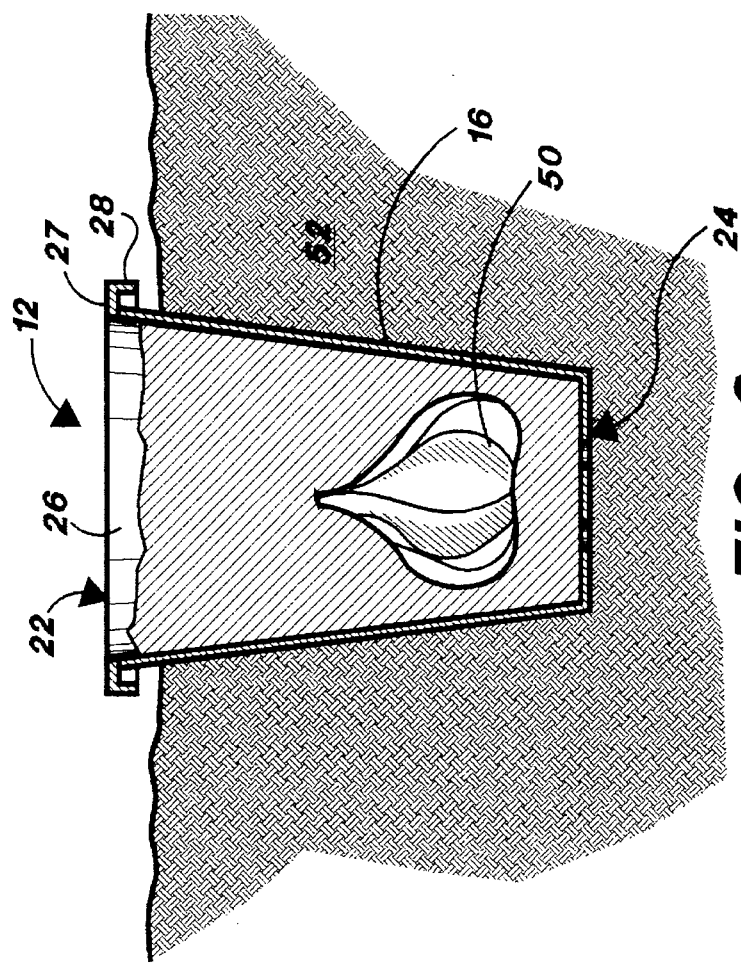
FIG. 2 is a cross-sectional view of the bulb container of the present invention without a handle and containing a bulb, with the bulb container shown buried in the ground.

FIG. 2 illustrates a cross sectional view of the bulb container 12 containing a bulb 50 and shown buried in the ground 52. The handle 15 has been removed so that the plant sprouting from the bulb 50 can continue its normal growth path and flourish without being deterred or blocked by the handle 15. Alternatively, the handle 15 may remain on the first hollow cylindrical member 16 throughout the entire growing season of the tuberous or bulberous plant.

Figure 3:
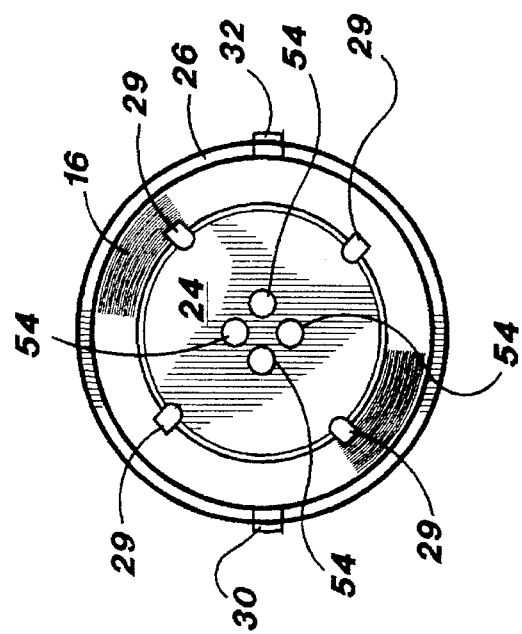
FIG. 3 is a bottom elevational view of the bulb container of the present invention shown in FIG. 1.

Turning now to FIG. 3, there is shown a bottom elevational view of the bulb container 12 of the present invention. A plurality of apertures 29 are evenly spaced along the area where the side of the first cylindrical member 16 meets the second closed bottom end 24 of the first cylindrical member 16. The plurality of apertures 29 function as root holes which allow the roots of the bulberous or tuberous plant to extend beyond the confines of the bulb container 12 and into the surrounding soil. The roots of the plant may then proliferate and expand to accommodate the size of the growing plant.

The second closed bottom end 24 of the first hollow cylindrical member 16 further includes a plurality of openings 54 located near the center of the closed bottom end 24 which function as drainage holes so that water and fertilizer may absorb into the ground surrounding the bulb container 12 thereby providing a consistent and continuous growth environment for the plant's roots which may extend through the plurality of apertures 29.

Figure 4:
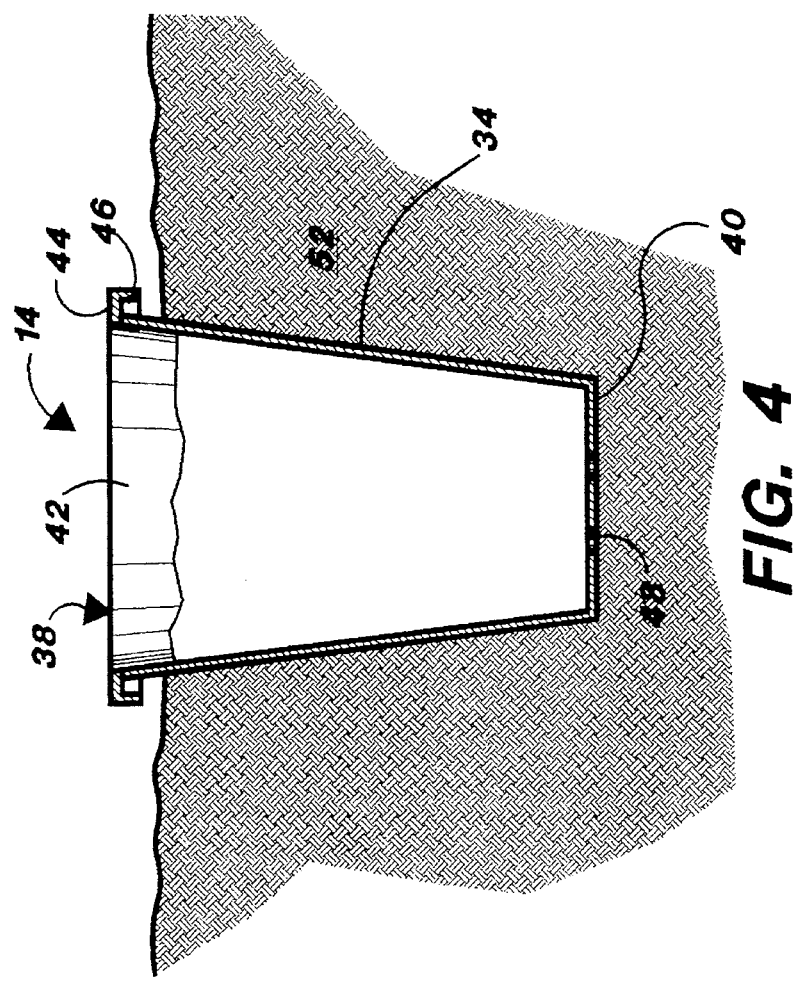
FIG. 4 is a side cross-sectional view of the placement container of the present invention shown positioned in the ground after removal of the bulb container.

FIG. 4 illustrates a side elevational view of the placement bucket 14 of the present invention shown positioned in the ground 52 after removal of the bulb container 12. After removal of the bulb container 12, the placement container 14 is pushed down into the ground to cover and preserve the hole that is created by the removal of the bulb container 12. As previously described, the placement container 14 may have a handle attached to the sides of the second hollow cylindrical member 34 to facilitate the removal of the placement container 14 from the ground prior to replanting the bulb container 12 containing a bulb 50. The placement container 14 may also comprise a color coding near its first open top end 38 which corresponds to the color of the bulb 50 and the bulb container 12 which previously occupied the hole in the ground that it now covers.

Figure 5:
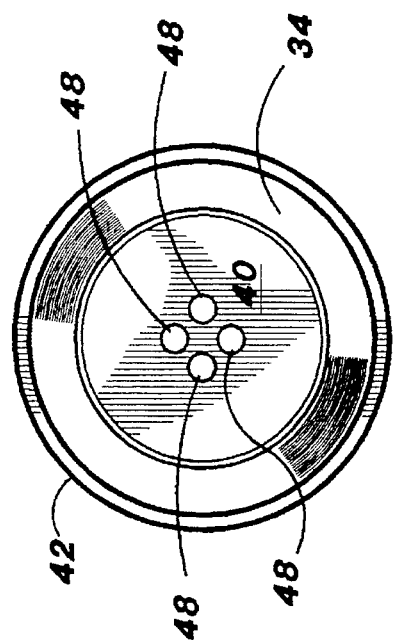
FIG. 5 is a top elevational view of the placement container of the present invention shown in FIG. 1.

A top elevational view of the placement container 14 of the present invention is shown in FIG. 5. As previously indicated, a plurality of ventilation holes 48 are contained in the second closed bottom end 40 of the second hollow cylindrical member 34.

Figure 6:
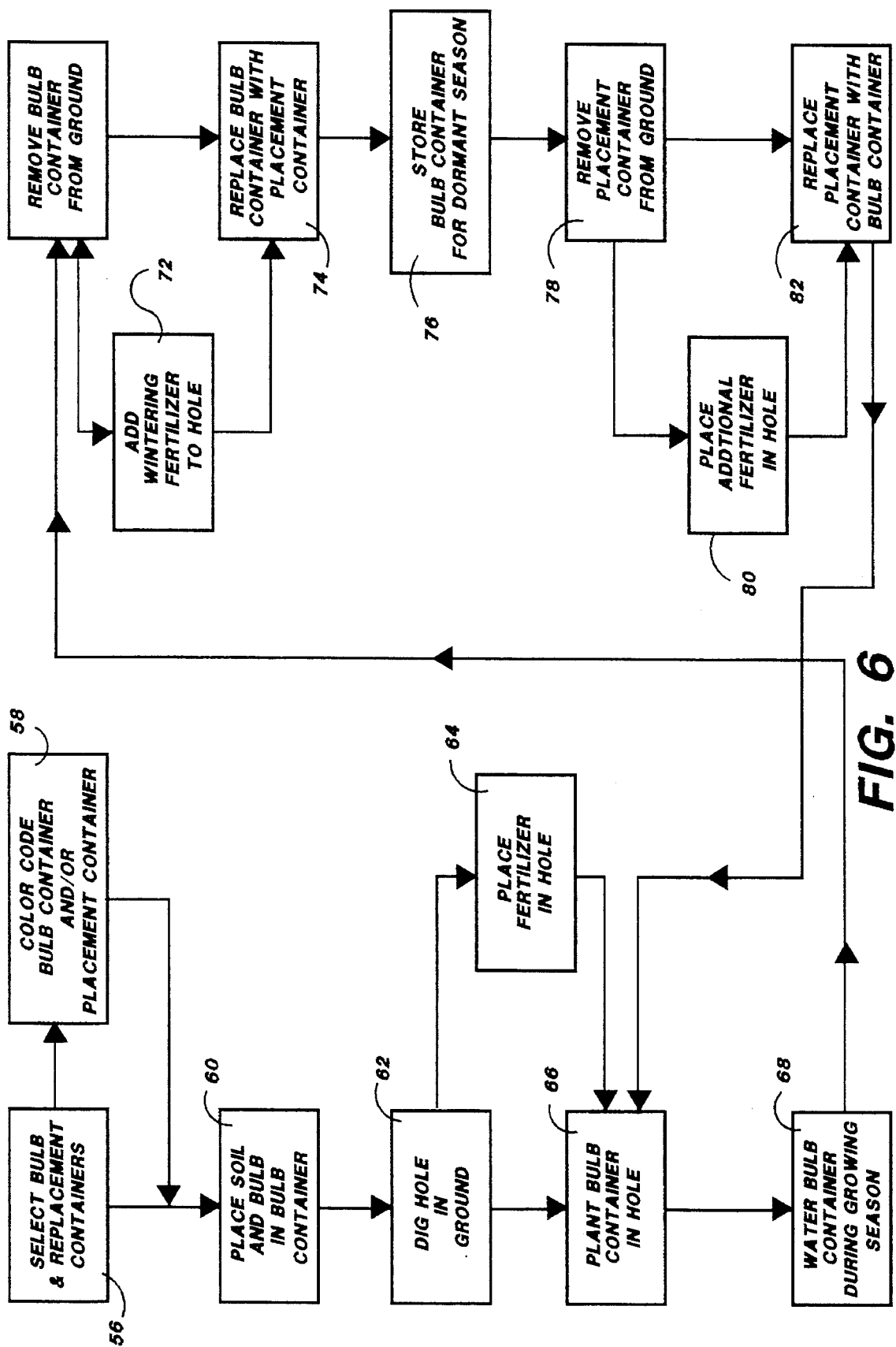
FIG. 6 is a flow diagram showing the bulb planting and maintenance method of the present invention.

A flow diagram showing the bulb planting and maintenance method of the present invention is shown in FIG. 6. The first step 56 requires the selection of a bulb container 12 and placement container 14 which will be used in conjunction with a specifically selected bulb. The second step 58 involves color coding both the bulb container 12 and the placement container 14 to correspond to the color of the plant bulb. This may be achieved by dipping or painting a portion of each of the containers 12,14 with a paint that is similar in color to the color of the bulb. A model plane paint kit is easy and convenient to use in that it contains small amounts of different colors of paints. The different colors may be easily mixed to match the colors of unusual bulbs. The handles 15 of the containers 12,14 may also be color coded with paint. Although the color coding of the containers 12,14 facilitates garden designing and visualization, the second step 58 of color coding is an optional step in the overall process.

The selected bulb and soil are then placed in the bulb container 12 during the third step 60. Preferably, about one inch of soil is placed in the bottom of the bulb container 12. The bulb is then placed in the soil with the pointed end facing up, or as the instructions suggest, and the bulb container 12 is filled with soil to a point approximately one-half inch from the top of the bulb container 12.

Step four 62 requires digging a hole in the ground to accommodate the bulb container 12. The hole is preferably dug such that it is large enough to hold the bulb container 12 and deep enough to leave approximately three-fourths inch to one inch of the sides of the bulb container 12 above ground. These ground hole specifications will help reduce insect problems and encourage plant roots to grow deeper in the ground while still keeping moisture near the root system.

Another optional step in the method for planting and maintaining bulbs is step five 64 which involves placing fertilizer in the bottom of the hole before planting the bulb container 12 in the hole in step six 66. In step six 66, the bulb container 12 is inserted into the hole and the open pockets surrounding the bulb container 12 are filled with soil. The inside of the bulb container 12 as well as the area around the edges should be thoroughly watered. The seventh step 68 in the process comprises watering the bulb container throughout the bulb's growing season until the bulb reaches its dormant stage.

In the fall, when the bulb enters its dormant stage, the bulb container 12 is removed from the ground as part of step eight 70 of the method for planting and maintaining a bulb. Step nine 72 includes the option of adding wintering fertilizer to the hole in the ground after removing the bulb container 12 in step eight 70.

Next, the bulb container 12 is replaced with the placement container 14 in step ten 74 by pushing the placement container 14 down into the hole such that a portion of the placement container 14 extends above the ground. The bulb container 12 is then stored in a dry place in step eleven 76 during the bulb's dormant season.

In the spring, following the bulb's dormant season, the placement container 14 is removed from the ground in step twelve 78 to uncover the hole which was preserved during the winter for planting the bulb. If the bulb container 12 and placement container 14 were previously color coded in the second step of the process, the bulb container 12 can be easily matched with the placement container 14 so that the same garden design is achieved. The optional step of placing additional fertilizer in the existing hole, step thirteen 80, may then be carried out.

Finally, the placement container 14 is replaced with the bulb container 12 in step fourteen 82 by inserting the bulb container 12 into the empty hole. Step six 66 through step fourteen 82 are then repeated for future years of efficient and easy bulb planting and maintenance.

While the preferred embodiment of the invention has been shown and described, it will be apparent to those skilled in this art that various modifications may be made without departing from the spirit of the present invention. Therefore, all suitable modifications and equivalents fall within the scope of the invention.

What is claimed is:

1. A method of maintaining an outdoor plant which must be removed from the ground during certain times of the year comprising the steps of:

a. providing a kit which includes first and second containers each having an open top, a closed bottom which includes a plurality of apertures, and sidewalls extending between the open top and closed bottom, wherein the sidewalls include a reinforced upper edge, and further wherein the containers have a substantially identical exterior profile;

b. filling the first container with a growing medium and a plant which experiences a growing season and a dormant season during the year;

c. burying the first container in the earth so that the earth substantially surrounds and molds itself about the bottom and sidewalls;

d. cultivating the plant during at least a portion of the growing season;

e. grasping the buried first container by its reinforced upper edge and pulling the first container from the earth without substantially disturbing the molded earth, thereby producing a hole having substantially the same size and shape as the first container; and f. inserting the second container in the hole to maintain the hole during the period when the first container is removed from the earth.

2. The method of claim 1 further comprising the step of providing the kit with at least one bail adapted to span the open top of the containers and to engage the reinforced upper edge of the open top.

3. The method of claim 2 further comprising the steps of:

a. engaging the upper edge of the buried first container with the bail; and b. pulling on the bail in order to remove the buried first container from the earth without substantially disturbing the molded earth.

4. The method of claim 2 further comprising the steps of:

c. engaging the upper edge of the inserted second container with the bail; and d. pulling on the bail in order to remove the inserted second container from the earth without substantially disturbing the molded earth.

5. The method of claim 2 further comprising coloring at least a portion of the bail to match the color of at least a portion of the plant.

6. The method of claim 1 further comprising the step of coloring at least a portion of at least one container to match the color of at least a portion of the plant.

7. The method of claim 1 further comprising the step of providing at least one of the first and second containers with a downwardly-descending lip at the reinforced upper edge.

8. The method of claim 7 wherein the first container is provided with a downwardly-descending lip at the reinforced upper edge, and further comprising the step of burying the first container in the earth so that substantially all of the closed bottom and sidewalls are covered and the lip and open top are exposed.

9. The method of claim 7 further comprising the step of providing the kit with at least one bail adapted to span the open top of the containers and to fit beneath the lip and engage the reinforced upper edge of the open top.

10. The method of claim 1 further comprising the step of providing at least one container with an aperture at the juncture of the closed bottom and sidewalls.

11. The method of claim 1 further comprising the step of providing at least one container with an aperture which is generally centrally located on the closed bottom.

12. The method of claim 1 further comprising the step of burying fertilizer in the earth beneath the first container.

13. The method of claim 1 further comprising the step of placing fertilizer in the hole before inserting the second container.

* * * * *